United States Patent [19]
Olsen et al.

[11] Patent Number: 6,118,757
[45] Date of Patent: *Sep. 12, 2000

[54] DATA INFORMATION DISK CARTRIDGE AND METHOD OF ASSEMBLY AND USE

[75] Inventors: Curtis G. Olsen, Mundelein; Patrick Sandell, Barrington, both of Ill.

[73] Assignee: Opticord, Inc., Palatine, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,660

[22] Filed: Feb. 26, 1997

[51] Int. Cl.[7] .................................................. G11B 23/03
[52] U.S. Cl. ............................................................ 369/291
[58] Field of Search .................................. 369/289, 291, 369/292; 360/133; 206/307, 308.1, 308.2, 308.3, 309, 311, 312, 387.11, 807

[56] References Cited

U.S. PATENT DOCUMENTS

| | | | |
|---|---|---|---|
| 4,481,552 | 11/1984 | Dona et al. | 360/133 |
| 4,536,812 | 8/1985 | Oishi et al. | 360/133 |
| 4,589,105 | 5/1986 | Nemoto et al. | 369/291 |
| 4,613,044 | 9/1986 | Saito et al. | 360/133 |
| 4,660,118 | 4/1987 | Faber | 360/133 |
| 4,680,662 | 7/1987 | Fukushima et al. | 360/133 |
| 4,682,322 | 7/1987 | Ohta | 369/291 |
| 4,688,206 | 8/1987 | Nakagawa et al. | 369/291 |
| 4,692,831 | 9/1987 | Suzuki | 360/133 |
| 4,698,714 | 10/1987 | Sugawara | 360/133 |
| 4,714,973 | 12/1987 | Kato et al. | 360/133 |
| 4,740,949 | 4/1988 | Davis | 369/291 |
| 4,746,013 | 5/1988 | Suzuki et al. | 369/291 |
| 4,908,817 | 3/1990 | Sandell et al. | 369/291 |
| 4,928,816 | 5/1990 | Zusy | 206/232 |
| 4,943,880 | 7/1990 | Muehlhausen et al. | 369/291 |
| 4,945,530 | 7/1990 | Sandell et al. | 369/291 |
| 4,994,930 | 2/1991 | Uehara | 360/97.01 |
| 5,072,326 | 12/1991 | Ikebe et al. | 369/291 |
| 5,093,823 | 3/1992 | Ouwerkerk et al. | 369/291 |
| 5,325,257 | 6/1994 | Akiyama et al. | 360/133 |
| 5,488,605 | 1/1996 | Ishimatsu | 369/291 |
| 5,570,341 | 10/1996 | Sandell et al. | 369/291 |
| 5,903,542 | 5/1999 | Sandell et al. | 369/291 |

FOREIGN PATENT DOCUMENTS

| | | | |
|---|---|---|---|
| 201870 | 11/1986 | European Pat. Off. | |
| 250111 | 12/1987 | European Pat. Off. | |
| 61-255571 | 11/1986 | Japan | |
| 62-33382 | 2/1987 | Japan | |
| 63-142582 | 6/1988 | Japan | 369/291 |
| 1-248378 | 10/1989 | Japan | 369/291 |

*Primary Examiner*—David L. Ometz
*Attorney, Agent, or Firm*—Leydig, Voit & Mayer, Ltd.

[57] ABSTRACT

A protective cartridge for a data information disk having a disk containing case and a door moveable on said case between a closed position covering the disk and an open position for exposing the disk during a read operation. The door is supported on a subassembly comprising a slider, a support rod upon which said slider is mounted, and a biasing spring for urging the slider toward a door closing position. The subassembly is mountable as a unit with easy snap action engagement into said case.

28 Claims, 7 Drawing Sheets

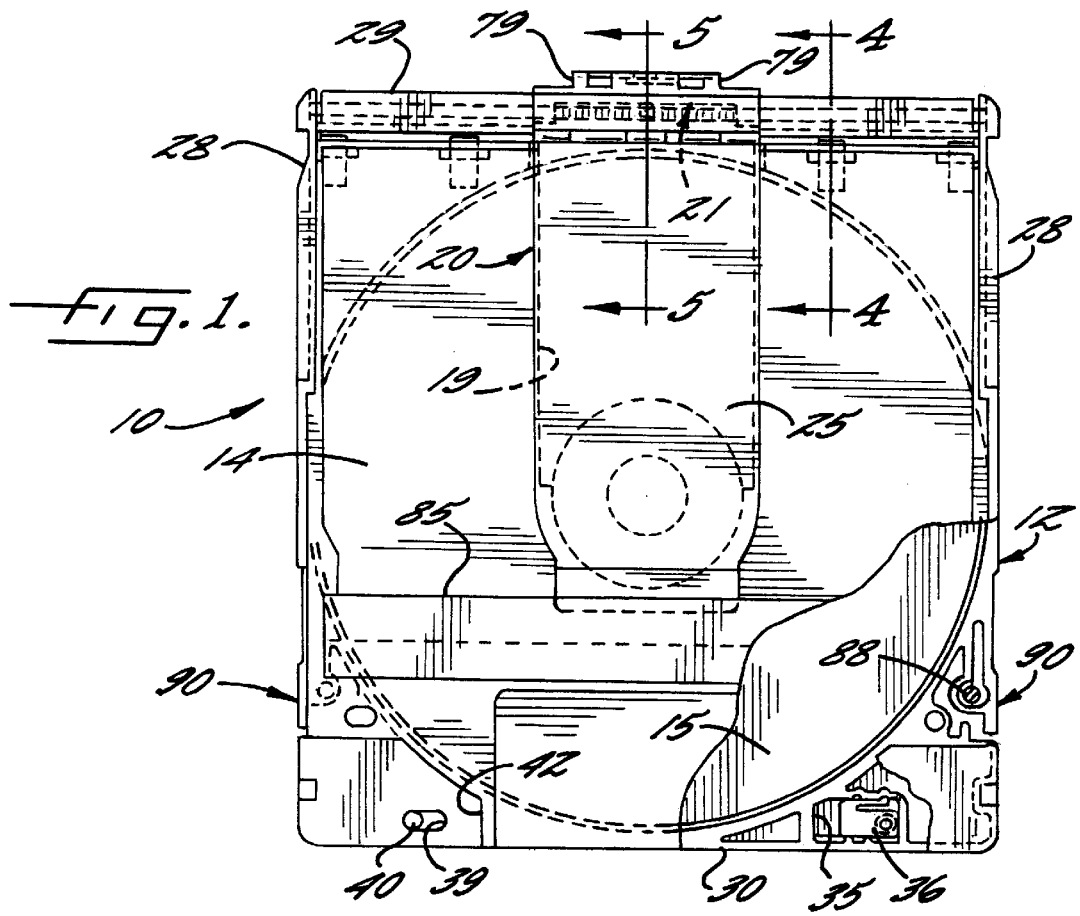
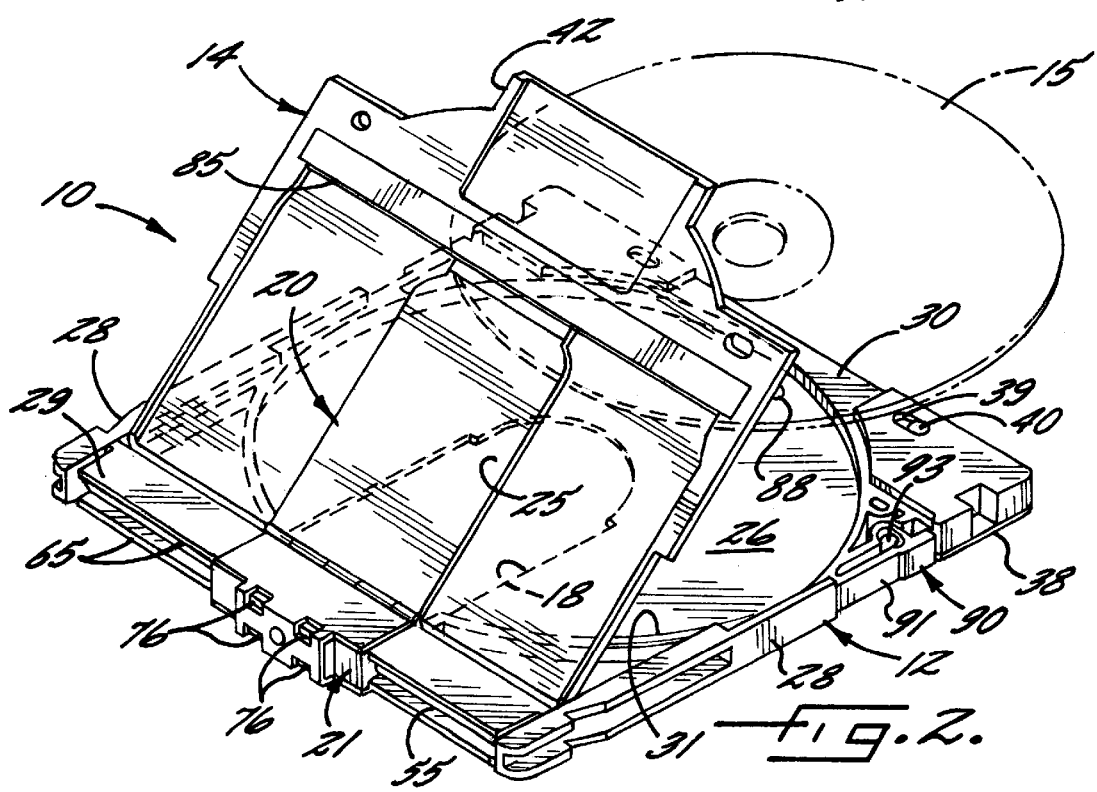

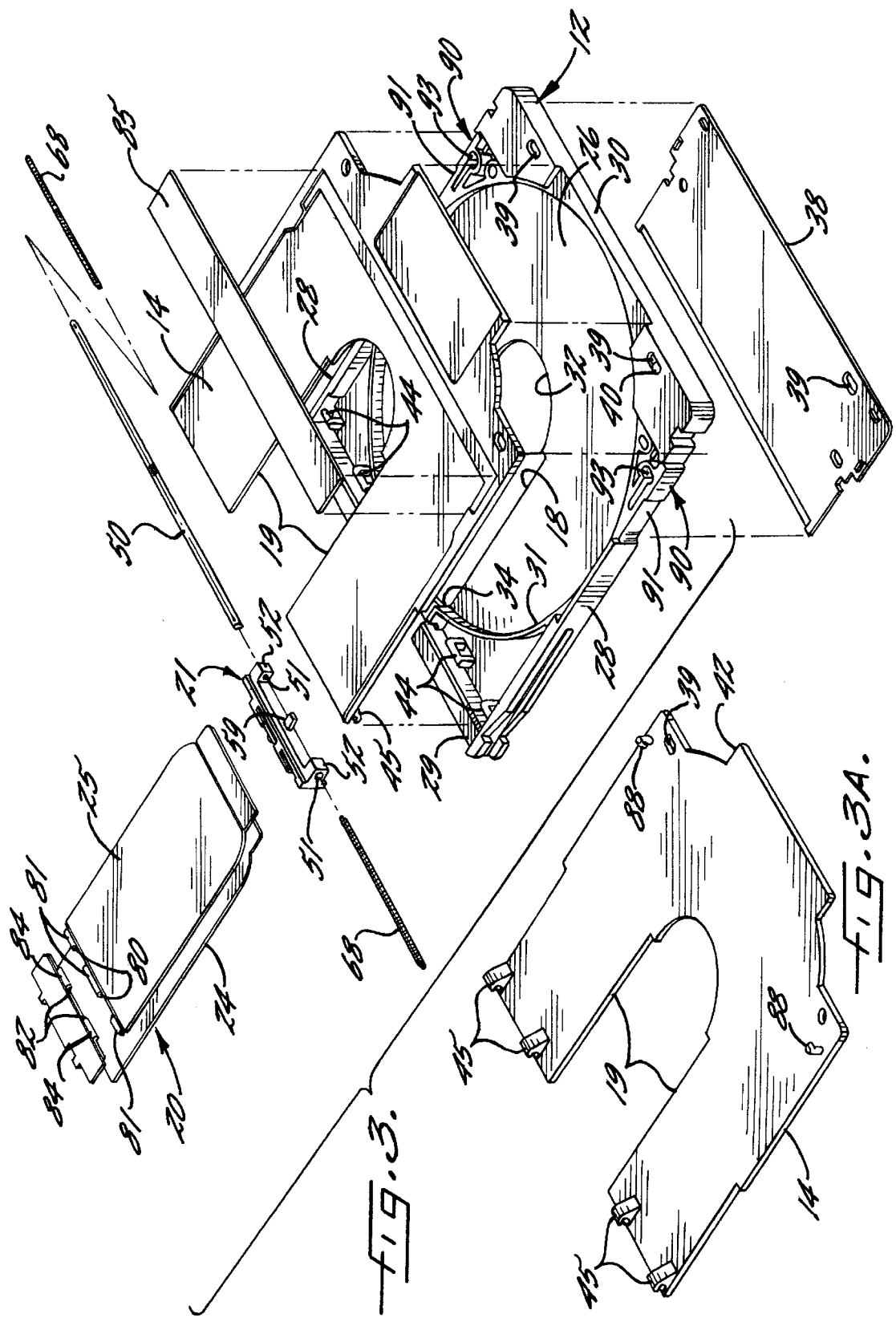

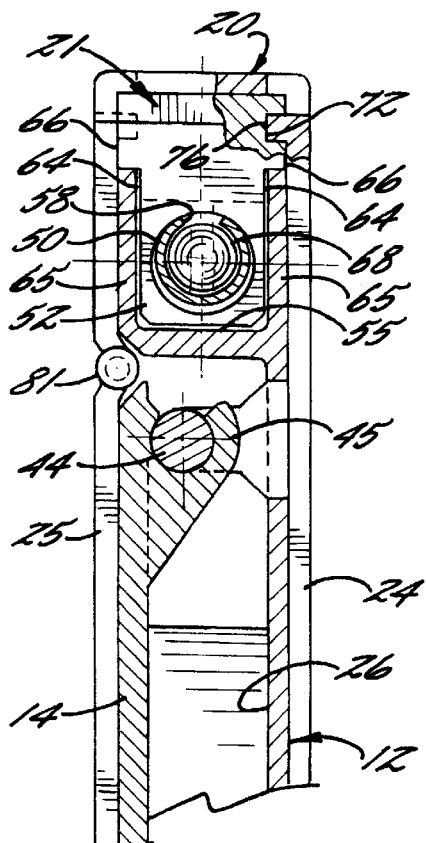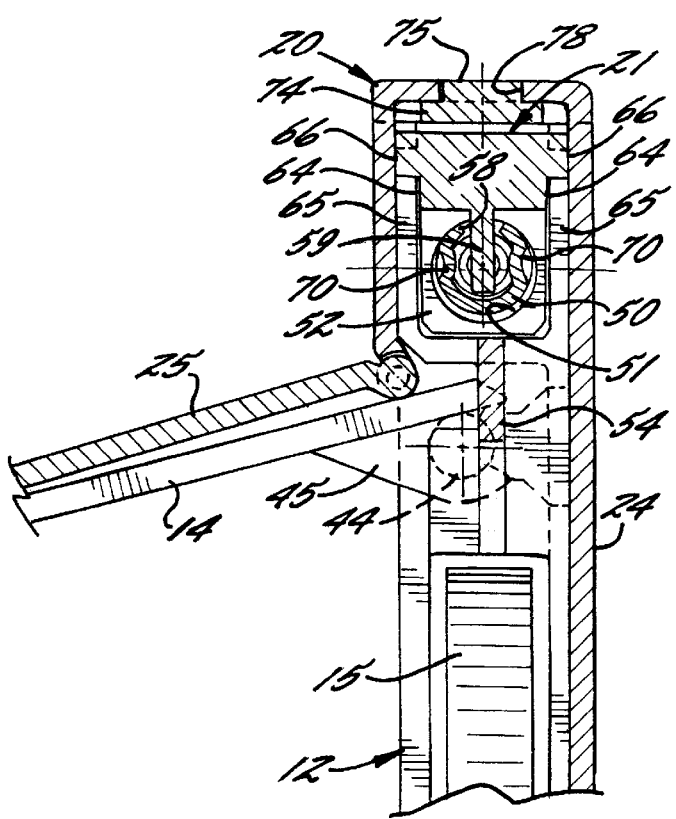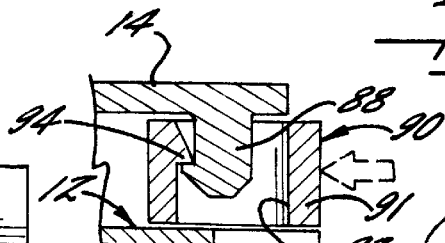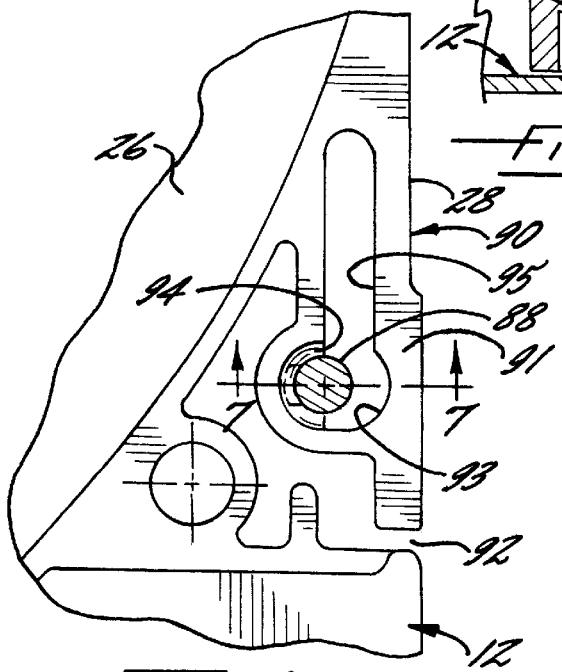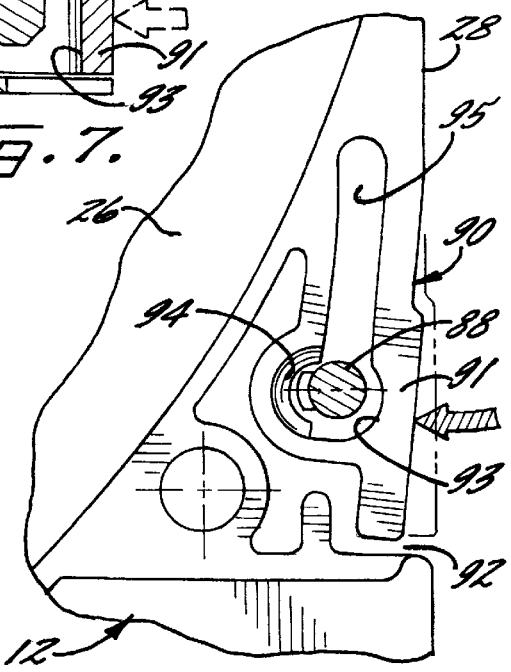

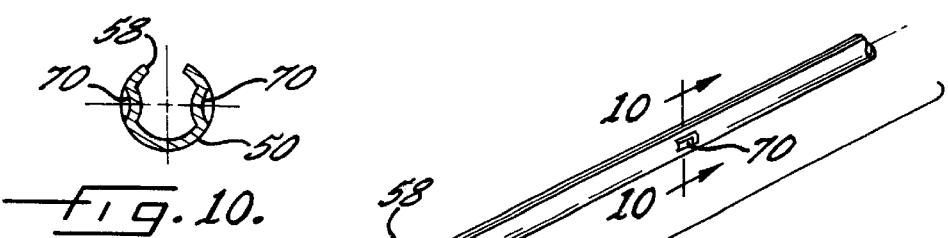
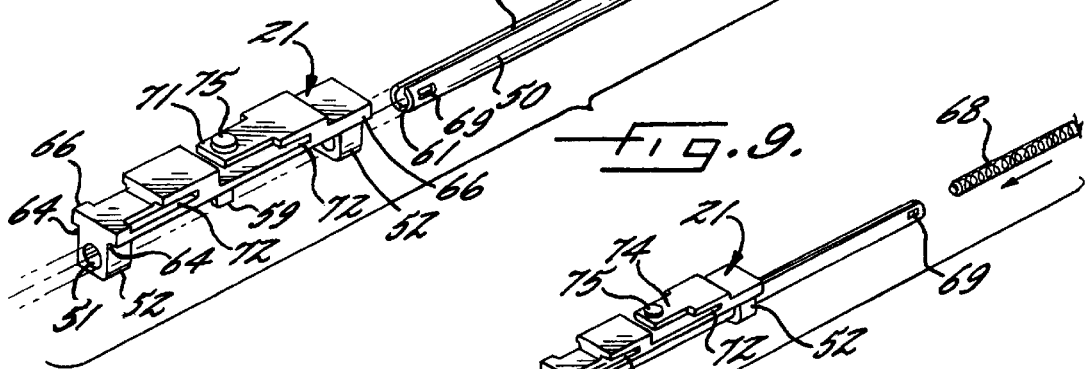
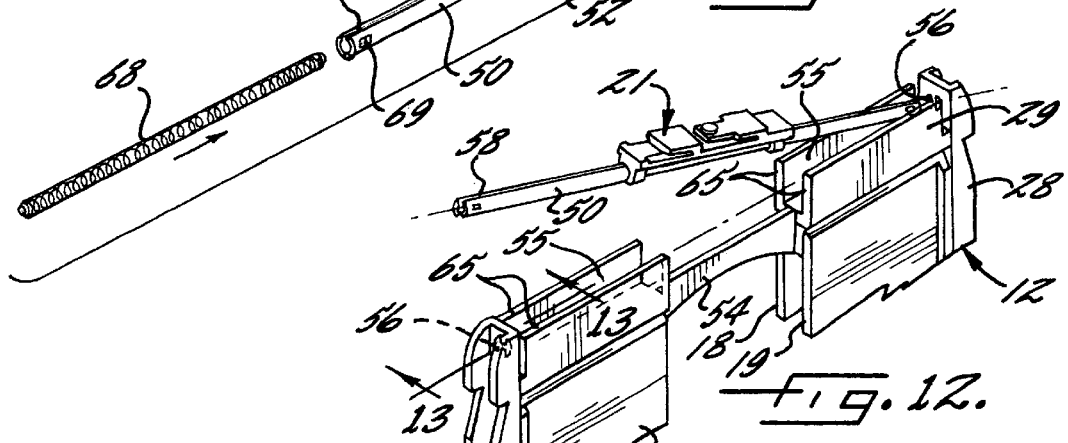
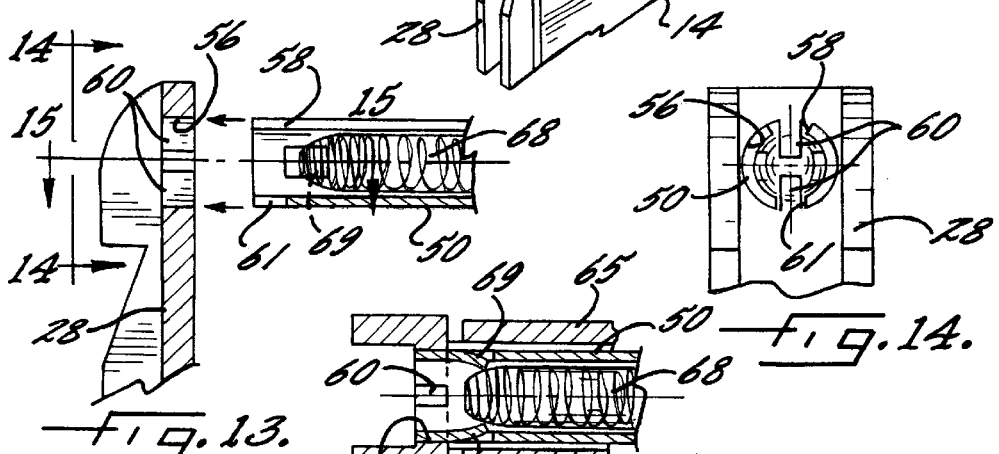

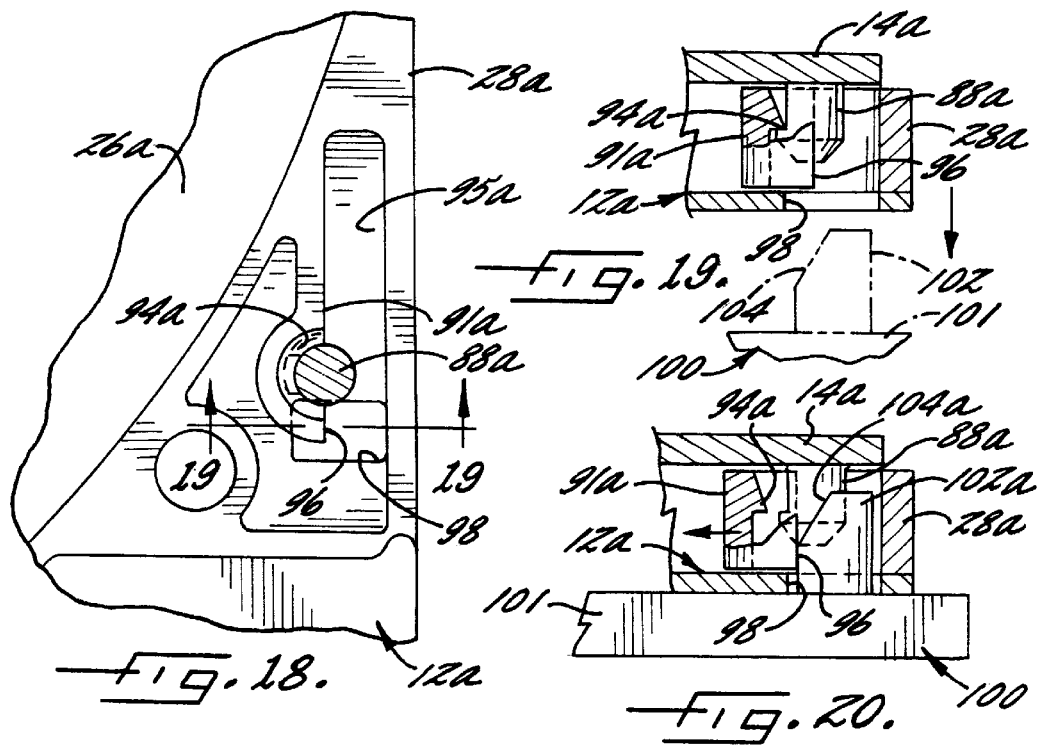
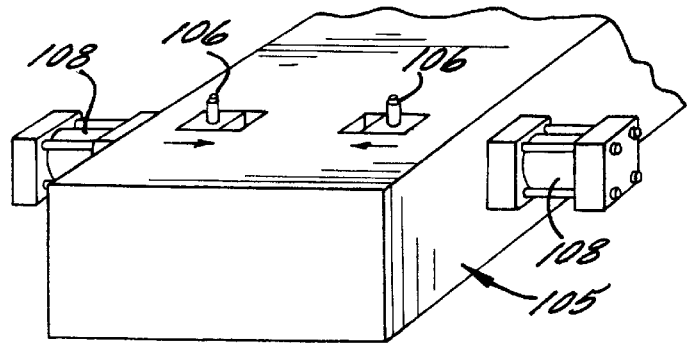
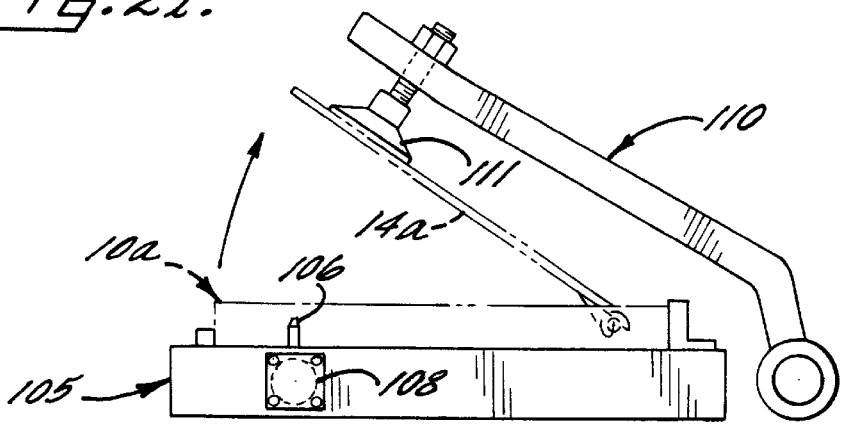

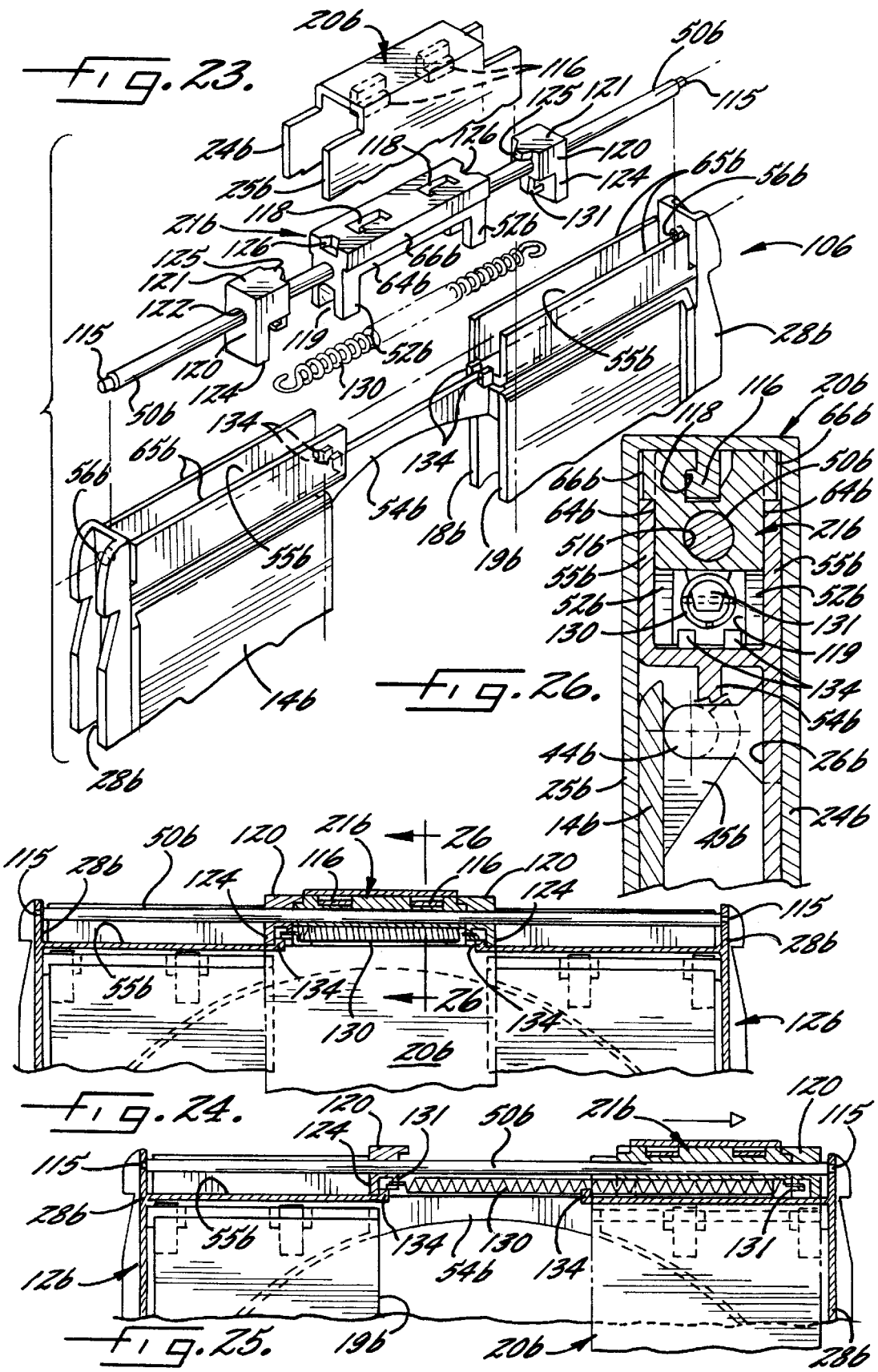

DATA INFORMATION DISK CARTRIDGE AND METHOD OF ASSEMBLY AND USE

FIELD OF THE INVENTION

The present invention relates generally to cartridges for data information disks, and more particularly, to cartridges which protectively contain the disk during handling and storage and which, during use, can be inserted directly into a disk drive of an optical reader/writer, and as an incident thereto, a sliding door of the cartridge is opened to expose portions of the disk to the reader/writer.

BACKGROUND OF THE INVENTION

Data information disks are being developed for storing increasingly large amounts of information, which can be used for data processing, high quality musical and video transmission, and other business and entertainment purposes. A growing need exists for protecting the disks during storage, handling and usage. Even small defects or contamination can significantly affect output and use of the massive information contained on the disk.

In commercial establishments which rent such disks to the public, it is desirable that the cartridges prevent access to the disk by the rental customer in order to minimize tampering, contamination, or other damage to the disk. On the other hand, because of the large numbers of disks carried in inventory by such commercial establishments, it is desirable that the disk be removable from the cartridge upon return to the rental store for storage without the cartridge, thereby substantially reducing the necessary inventory and space requirements for such cartridges. Indeed, the number of cartridges in inventory then need only correspond to the rental volume, and not to the inventory of disks.

Likewise, when such disks contain confidential and proprietary business information, the need exists for cartridges which prevent access to and removal of the disk from the cartridge by unauthorized personnel, but which enable relatively easy access by authorized personnel. On the other hand, non-business consumer purchasers of compact disks generally prefer storing the disks in cartridges designed for easy access for disk removal, replacement, or substitution.

From a manufacturing standpoint, the need exists for the cartridge to be susceptible to automated assembly, through use of robots and other automatically controlled assembly mechanisms. Due to the multiplicity of parts and the complexity of design of existing data information disk cartridges, heretofore such cartridges have not lent themselves to easy or automated assembly. The desire for cartridges with specific features for particular usage, such as the ability to prevent unauthorized access to the disk and/or permanently contain the disk, or the ability to permit easy opening to the cartridge by a consumer/user, further necessitates customized manufacture and increased production costs.

OBJECTS AND SUMMARY OF THE INVENTION

It is an object of the present invention to provide a data information disk cartridge adapted for more effective and efficient usage by commercial establishments, and particularly those which rent such disks to the general public.

Another object is to provide a data information disk cartridge as characterized above which prevents access to a contained disk by unauthorized personnel, while enabling easy access and removal of the disk by authorized personnel.

A further object is to provide a cartridge of the above kind that gives the user a perception of permanently containing a disk, while at the same time enabling authorized persons easy access for disk removal and replacement. A related object is to provide a cartridge which has a pivotally mounted cover with a latching arrangement that is neither visible nor apparent to unauthorized users of the cartridge.

Still another object is to provide such a data information disk cartridge that requires a pre-formed key or actuating apparatus for enabling access to a contained disk.

Yet another object is to provide a disk cartridge of the foregoing type that lends itself to efficient manufacture and automated assembly.

Another object is to provide a method of making a data information cartridge wherein a relatively small tooling change in the base latching mechanism results in a cartridge with a cover that permits easy manual opening and closing, or a cartridge which gives the user the perception of permanently containing the disk and which requires a special tool or key for opening.

A further object is to provide a cartridge with a sliding door mounting structure that lends itself to easier automated assembly.

Another object is to provide such a cartridge in which the sliding door mounting structure permits more reliable door movement between opening and closing positions on either side of an access opening of the cartridge.

Other objects and advantages of the invention will become apparent upon reading the following detailed description and upon reference to the drawings, in which:

BRIEF DESCRIPTION OF THE DRAWINGS

FIG. 1 is a top plan view of an illustrative data information disk cartridge in accordance with the invention, with a portion broken away to show the cover latching mechanism;

FIG. 2 is a perspective of the cartridge shown in FIG. 1, but with the cover of the cartridge in an open position and an optical data information disk, depicted in phantom, shown in exploded relation to the cartridge;

FIG. 3 is an exploded perspective of the illustrated cartridge;

FIG. 3a is a perspective of the cartridge cover in upside down relation to show its underside;

FIGS. 4 and 5 are enlarged fragmentary sections taken in the planes of line 4—4 and 5—5 in FIG. 1;

FIG. 6 is an enlarged, horizontal fragmentary section of the manually operable cover latching mechanism of the illustrated cartridge, showing the latch in a locked position;

FIG. 7 is a fragmentary vertical section, taken in the plane of line 7—7 in FIG. 6;

FIG. 8 is a horizontal section, similar to FIG. 6, but showing the cover latch in an unlocked position;

FIG. 9 is an exploded perspective illustrating he assembly of the door supporting slider of the illustrated cartridge onto its support and guide rod;

FIG. 10 is an enlarged vertical section of the slider support and guide rod, taken in the plane of line 10—10 in FIG. 9;

FIG. 11 is an exploded perspective showing assembly of slider return springs into the support and guide rod following assembly of the slider thereon;

FIG. 12 is a perspective showing assembly of the support and guide rod, slider, and spring subassembly into a base of the illustrated cartridge;

FIG. 13 is an enlarged fragmentary section taken in the plane of line 13—13 in FIG. 12, showing assembly of the slider support and guide rod into the base of the cartridge;

FIG. 14 is a partial end view of the cartridge base and slider support and guide rod, taken in the plane of line 14—14 in FIG. 13;

FIG. 15 is a fragmentary section of the support and guide rod assembled in the cartridge base, taken in the plane of line 15—15 in FIG. 13;

FIG. 18 is an enlarged horizontal section of the cover latching mechanism of the cartridge shown in FIG. 17;

FIG. 19 is a vertical section taken in the plane of line 19—19 in FIG. 18, illustrating the cartridge being lowered onto a cover unlatching tool shown in phantom;

FIG. 20 is a vertical section, similar to FIG. 19, showing the cartridge fully positioned on the unlatching tool;

FIG. 21 is a perspective of an automated cover unlatching fixture for the cartridge shown in FIGS. 17;

FIG. 22 is a side elevational view of a cover lifting fixture for opening and closing the cover during automated assembly of a disk therein;

FIG. 23 is an exploded perspective of a cartridge having an alternative form of door supporting slider arrangement according to the present invention;

FIG. 24 is a fragmentary vertical section of the cartridge shown in FIG. 23 with the door in a closed position;

FIG. 25 is a fragmentary vertical section, similar to FIG. 24, showing the door in an open position; and FIG. 26 is an enlarged fragmentary section taken in the plane of line 26—26 in FIG. 24.

Figure 16:
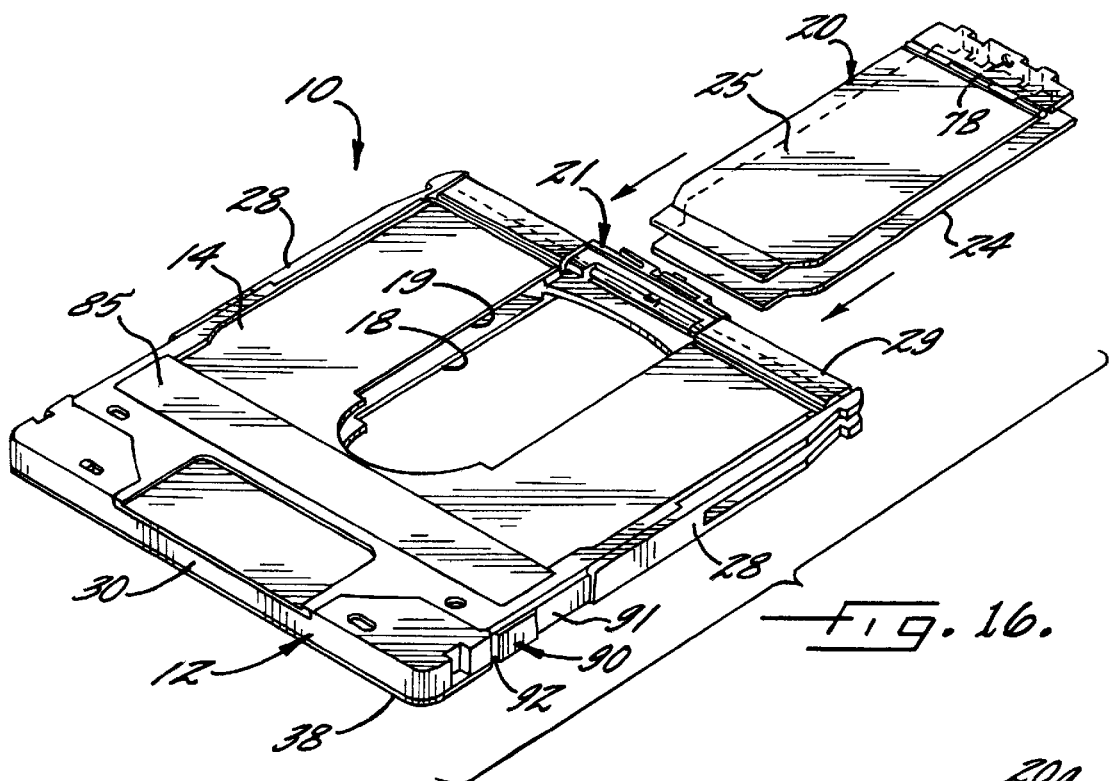
FIG. 16 is an exploded perspective showing assembly of the door onto the cartridge.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIGS. 1–3 of the drawings, there is shown an illustrative protective cartridge 10 for use with a re-writable optical disk having alpha numeric data recorded thereon. The cartridge 10 comprises a disk containing case defined by a base 12 and a cover 14 mounted for pivotal movement on the base 12 between an open position for permitting insertion and removal of a disk 15 into the cartridge (as depicted in FIG. 2) and a closed position for protectively containing the disk. The base 12 and cover 14 each are formed with a respective access aperture 18, 19, and a door 20, which is mounted on a slider 21 and has a pair of shutters 24, 25, is moveable between a closed position where the shutters 24, 25 cover the access apertures 18, 19 and an open position to either side of the access apertures. In some respects, the cartridge 10 is similar to that disclosed in Sandell et al. U.S. application Ser. No. 08/643,001, the disclosure of which is incorporated herein by reference.

The base 12, which is preferably plastic injection molded, is generally rectangular in shape and includes a bottom wall 26, upstanding side walls 28, and forward and rear ends 29, 30, respectively. A semicircular wall or rib 31 extends in upstanding relation to the bottom wall 26, which together with the rear cartridge end 30, defines a pocket for the disk. The access aperture 18 in the base 12 is formed in the bottom wall 26 and is generally U-shaped, having a cylindrical end 32 coaxial with a contained disk and a forwardly extending channel portion 34, which in this instance, is slightly greater in width than the diameter of the cylindrical end 32.

The base 12 further defines a pair of pockets or recesses 35 in its underside adjacent the rearward end thereof for containing respective write protector switches 36 of a conventional type (FIG. 1). For retaining the write protector switches 36 within the recesses 35 and for defining a guide groove for the door shutter 24, the base 12 in this instance has a retainer plate 38 sonically welded transversely across its rearward underside. The retainer plate 38 and the upper side of the base 12 are formed with transverse slots 39 adapted for receiving and guiding a respective upwardly extending pin 40 of the protector switches 36. The rearward end of the cover 14 is narrowed to define a rearwardly extending rectangular section 42 adapted for receipt within a recessed area of the rear casing end 30 between the write protector switches 35 in co-planer relation with the top surface of the base.

The cover 14 is defined by a generally rectangular plastic injected molded plate, with the access aperture 19 therein being shaped complementary to the access aperture 18 of the base 12 and extending through a forward end of the cover. For hingedly supporting the cover 14 for pivotal movement relative to the base 12, the base 12 is formed with a plurality of laterally spaced, horizontally disposed, hinge pins 44 in upstanding relation to the bottom wall 26 of the base and the cover 12 is formed with a corresponding number of integrally formed C-shaped retainers 45 (FIGS. 3 and 4). The C-shaped retainers 45 in this instance are designed to extend about 270 degrees about the hinge pins 44 so as to define a pin receiving opening that enables the plastic retainers 45 to be forced over the hinge pins with resilient snap action, such that when mounted, the C-shaped retainers 45 are captively, but pivotally, secured to the hinge pins 44. For enhanced support of the cover 12, pairs of door supporting hinge pins 44 are disposed on opposite sides of the access apertures 18, 19.

In accordance with an important aspect of the invention, the door supporting slider is mounted for movement between door opening and closing positions on a relatively simple and easy to assembly support and guide rod. In the illustrated embodiment, the slider 21 is mounted on a transversely disposed tubular support and guide rod 50 by means of axially aligned apertures 51 formed in depending mounting flanges 52 located at opposite ends of the shutter 21. The support and guide rod 50 in this case is disposed within a pair of forwardly opening channels 55 formed in the forward end 29 of the base 12 on opposite sides of the access apertures 18, 19. The channels 55 are interconnected by a rigidifying plate 54 extending between end walls of the channels 55 in a central plane of the cartridge (FIG. 12). For supporting the rod 50 within the channels 55, forwardmost ends of the base side walls 28 are formed with rod receiving apertures 56, and the rod 50 has a length greater than the lateral spacing of the sidewalls 28. (FIGS. 12–15). It will be understood that the sides 28 of the cartridge base 12 in which the rod mounting apertures 56 are located have sufficient resiliency so as to permit snap action mounting of the support rod 50 into the apertures 56.

In keeping with the invention, the support and guide rod is formed with a longitudinally extending slot 58 on a forward side thereof for receiving a depending guide flange 59 of the slider 21, which rides in the slot 58 and guides movement of the slider 21 and door 20 along the rod 50 (FIGS. 5, 9, 10). In order to properly orient the support and guide rod 50, the rod mounting apertures 56 have ribs 60 on top and bottom sides thereof which are respectively engageable in the guide slot 58 and a diametrically opposed locating slot 61 formed in each end of the rod 50, as depicted in FIGS. 13–15.

For further facilitating and guiding movement of the slider 21 relative to the base 12, the slider 21 is formed with guide surfaces 64 on opposite sides thereof, including side walls of the mounting flanges 52, which are guided by forwardly extending legs 65 of the channels 55 (FIGS. 4 and 5). The slider 21 further is formed with transversely extending guide flanges 66 on opposite sides thereof which extend the length of the slider and ride on end surfaces of the channel legs 65. The transverse guide flanges 66 in this instance have side peripheral edges in substantial co-planar relation with the top and bottom sides of the base 12.

For biasing the slider 21 and door 20 mounted thereon to a central closed position, a pair of return springs 68 are compressively contained in opposite ends of the support and guide rod 50. The return springs each are secured at an outer end by respective inwardly extending angled barbs 69 (FIG. 15) formed adjacent the support and guide rod 50 and are biased against respective sides of the inwardly extending V-shaped barbs 70 (FIG. 10) formed in the center of the guide rod 50. By virtue of the orientation of the angled barbs 69 with their ends extending toward the center of the tube, it can be seen that the return springs 68 can be assembled into the tube from an end thereof, with the barbs 69 securing the springs against outward movement. The central barbs 70 extend into the tube from opposite sides thereof so as to define stops for the return springs 68, while being spaced apart from each other sufficient to allow passage of the slider guide flange 59 (see FIG. 5 for example). Hence, it will be seen that when the slider 21 moved in one direction, the guide flange 59 will engage the return spring 68 on the side to which the slider is being moved to further compress the spring, while the spring on the opposite side will remain in a biased condition against the central barbs 70. Likewise, movement in the slider 21 in the opposite direction, will cause the guide flange 59 to engage and further compress the opposite return spring 68, while the spring on the other side will remain in a compressed state against the central barbs 70. Thus, upon release of the slider 21 following movement in either direction, the respective return spring 68 engaged and compressed by the slider 21 will cause return of the slider 21 and door 20 to its central door closing position as shown in FIG. 1.

In order to enable simple snap action mounting of the door 20 onto the slider 21 following assembly of the support and guide tube 50, slider 21, and return springs 68 in the cartridge base 12, the slider 21 is formed with pairs of locking grooves 72 in opposite sides thereof and a depressible lever arm 74 with an upstanding locking button 75 disposed centrally between the locking grooves 72 (FIG. 9). The door 20 in turn is formed with pairs of inwardly directed locking ledges 76 in the sides thereof and an aperture 78 located centrally in the outwardly exposed end thereof (FIGS. 4–5). The door 20 may be positioned onto the slider 21 in offset longitudinal relation to the locking grooves 72 (i.e., to the left as viewed in FIG. 9) and then forced downwardly to depress the lever arm 74 and enable the slider 21 to be moved longitudinally (to the right as viewed in FIG. 9) such that the locking ledges 76 enter the locking grooves 72. Upon reaching the properly mounted position, the depressed lever arm 74 will urge the locking button 75 into the door aperture 78 to retain the door 20 in mounted position (FIG. 5). It will be understood by one skilled in the art that while the illustrated door is shown to be mounted on a separate slider, alternatively, the door and slider could be integrally formed. It will further be understood that the slider 21 and/or door 20 may be formed with appropriate shoulders or apertures, such as the shoulders 79 (FIG. 1), for engagement by the pin of the pivot arm of a disk reader for effecting movement of the slider 21 and door 20 in either opening direction as an incident to positioning of the cartridge into a disk reader.

To permit opening of the cartridge cover 14 after mounting of the door 20, the door shutter 25 in this instance is hinge-mounted for simultaneous pivotal movement with the cover 14. The hinge mounting is defined by a series of axially aligned ball and socket joints defined by balls 80 formed on opposite sides of forwardly extending extensions 81 of the shutter which are engaged in sockets 82 formed in opposite sides of rectangular extensions 84 of the main door structure (FIG. 3). For guiding sliding movement of the shutter 25 on the cover 14, a rectangular retainer plate 85 is fixed to the cover 14 in overlying relation to a rearward end of the shutter 25, which together with the cover 14, defines a guide slot for the shutter 25.

To permit releasable securement of the cover 14 in closed position as on the base 12, the cartridge has latch portions or members which are adapted for easy manual disengagement. The illustrated cover 14 is formed with a pair of depending latch hooks 88 adapted for engagement with respective finger tab nits 90 integrally formed with the base 12 on opposite sides thereof (FIGS. 6–8). Each finger tab unit 90 comprises a manually depressible and lever arm 91 which forms a part of the base side wall 28, with only a small interruption or gap 92 in the side wall 28. The lever arm 91 is formed with a transversely elongated aperture 93 in an end thereof which defines a locking ledge 94 on an inner, underside thereof and which communicates with an elongated slot 95 along the side wall 28 for enhancing flexibility of the lever arm 91. When the cover 14 is in its closed position and each finger tab unit 90 is in a relaxed state, and the latch hooks 88 of the cover 14 extend through the lever arm aperture 93 and beneath the locking ledge 94 thereof, as depicted in FIGS. 6 and 7, securing the cover 14 in closed position. By squeezing the finger tab units 90 between the thumb and finger of one hand, the levers 91 are flexed inwardly to move the locking ledges 94 inwardly from beneath the latch hooks 88, as shown in FIG. 8, thereby releasing the cover 14 and permitting it to be pivoted to an open position. Returning the cover 14 to a closed position will cause the latch hooks 88 to engage the finger units 90 and momentarily cam the levers 91 inwardly to allow the latch hooks 88 to pass the ledges 94, after which the levers 91 spring outwardly to cause the locking ledges 94 to move into engagement with the latch hooks 88.

In keeping with the invention, the cartridge, including the slider support and guide mechanisms, lends itself to efficient manufacture and assembly and can be adapted, with relatively small change, to effect product feature variations. At the outset, each component of the cartridge 10 (except for the compression springs 68 and support and guide rod 50 which may be metal), are economically manufacturable by plastic injection molding. The components, furthermore, lend themselves to efficient preliminary and final assembly. A first subassembly can be produced by assembling the write protector switches 36 into the pockets 35 of the base 12, and sonically welding the retainer 38 in place on the base over the write protector switches. A second subassembly can be produced by sonically welding the retainer 85 over the cover 14, and a third subassembly can be produced by positioning the slider 21 onto the support and guide tube 50, and assembling springs 68 into opposite ends of the tube. Final assembly can be effected by (1) snapping the slider 21, tube 50 and spring 68 subassembly into the base 12; (2) snapping the cover 14 onto the hinge pins 44 of the base 12, and (3) positioning the door 20 over the slider 21 and then longitudinally moving the door 20 into snap action engagement therewith. It will be understood that while the illustrated cartridge 10 has been shown with a door 20 that is slidable in either direction with respect to the access openings 18, 19, the cartridge can be easily modified to effect door movement in only one direction, such as by eliminating a guide channel 55 and/or compression spring 68 on one side thereof.

In keeping with a further important aspect of the invention, only a small design and manufacturing change is necessary for converting the cartridge from one in which the cover 14 is easily, manually releasable, as heretofore described, to a cartridge which precludes unauthorized opening of the cover and which gives the user a perception of permanently containing the disk. To effect such product change, the tooling for the cartridge base 12 need only be slightly modified to eliminate the gap 92 in the side wall 28, to form a gap 96 in the end of the lever arm 91, and to form an access opening 98 in the base beneath the gap 96, as depicted in the cartridge 10a illustrated in FIGS. 17 and 18, wherein items similar to those described above have been given similar reference numerals with the distinguishing suffix "a" added. Such design changes result in a locking ledge defining lever arm 91a that is separate from the side wall 28 and is neither accessible, nor visible from a side of the container. In such modified cartridge 10a, the cover 14a similarly is latchedly secured in its closed position by engagement of the hooks 88a thereof with locking ledges 94a of the lever arm 91a. Since the sides 28 of the cartridge base are not deflectable, nor directly coupled to the moveable end of the lever arms 91a, manual disengagement of the latches is neither possible for the sides of the cartridge, nor apparent. Hence, the cartridge 10a has particular utility in rental stores in which there is a desire to prevent the public from obtaining access to the contained disk, which can contaminate or otherwise damage the disk. Likewise, such cartridges 10a have particular utility for businesses in which handling of disks containing confidential information is restricted to authorized personnel.

In carrying out the invention, the cartridge 10a is adapted for easy unlatching and opening by authorized personnel using a pre-formed tool or fixture. Referring to FIGS. 19 and 20, there is shown a relatively simple, inexpensive tool 100, such as might be used in a rental store, which comprises a platform or base 101 with a pair of upstanding pins 102 having a lateral spacing corresponding to the spacing between the access apertures 98 in the base 12a of the cartridge. Each pin 102 has an inclined camming surface 104 on an inner side thereof. It will be seen that by merely positioning the cartridge 10a onto the tool 100 with the pins 102 extending upwardly into the apertures 98, such as can be easily effected by a store clerk, the camming surfaces of the pins 102 will be moved into engagement with the ends of the lever arms 91a causing the lever arms 91a to be moved inwardly from their locking position (shown in FIG. 19) to a position in which the locking ledges 94a of the pivotal arms 91a are removed away from the hooks 88a (as depicted in FIG. 20), releasing the cover 14a and permitting it to be pivoted to an open position. While such unlatching may be simply and easily accomplished, it may be done only by personnel possessing the tool, thereby enabling rental stores and businesses to restrict handling of the contained disks to authorize personnel.

In further keeping with the invention, to enable automated and high volume assembly of disks into cartridges in a manufacturing line, an automated unlatching fixture 105 may be provided, as depicted in FIGS. 21–22. The fixture 105 in this case has a base or platform and a pair of upstanding pins 106 which are laterally moveable with respect to each other by a respective air cylinder 108. Upon positioning of the cartridge 10a onto the fixture, such as by an automated robot, with the pins 106 extending upwardly into the base apertures 98, the cylinders 108 may be actuated to move the pins 106 inwardly toward each other, thereby moving the pivot arms 91a to their unlocking positions. An automatically operated pivotal arm 110 with a suction head 111 at an end thereof, as depicted in FIG. 22, may be lowered in to engage the cover 14a by the suction head 111, and then raised to lift the open position for permitting automated assembly of a disk into the cartridge, after which pins 106 are returned to their original positions and the arm 110 is lowered to close and latch the cover 14a.

Figure 17:
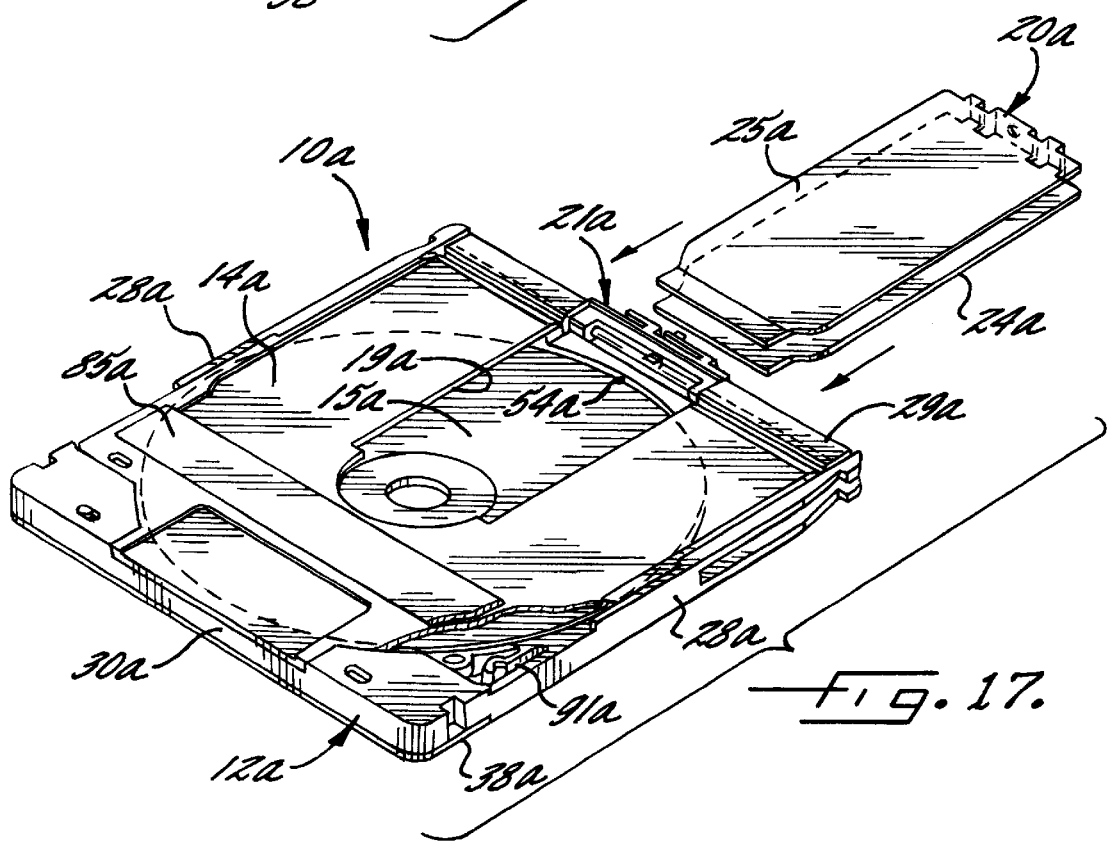
FIG. 17 is an exploded perspective showing assembly of an alternative one-piece form of door onto a cartridge having an alternative form of cover latching mechanism which requires a special tool or key for opening.

It will be understood by one skilled in the art that the cover latching arrangement of the cartridge 10a gives the user of the cartridge the perception that the cartridge is a permanent container for the disks. Hence, it may be desirable that the cartridge door not have a hinged shutter, which might tend to encourage a user to attempt unauthorized opening of the cartridge. Consistent with the present invention, the assembly of the cartridge 10a with such a door is easily accomplished by assembling onto the cartridge a one-piece non-pivotal shutter door 20a, in lieu of a hinged shutter door 20, as depicted in FIG. 17.

Referring now to FIGS. 23–26, there is shown a cartridge 106 having an alternative door mounting structure, wherein items similar to those described above have been given similar reference numerals with the distinguishing suffix "b" added. The cartridge 106 in this case has a door supporting slider 21b formed with a mounting opening 51b extending through the length thereof for positioning onto a solid support rod 50b. The support rod 50b has reduced diameter ends 115 for snap action positioning within mounting apertures 56b in the base sidewalls 28b. The door 20b is adapted for snap action mounting on the slider 21b by means of depending locking tongues 116 of the doors that are positionable into a camming and locking grooves 118 formed in the end of the slider 21b in a manner similar to that disclosed in the above referenced application Ser. No. 08/643,001.

For guiding movement of the door mounting slider 21b on the support rod 50b, the slider has side guide surfaces 64b and transverse guide flanges 66b, similar to the slider described above. Depending flanges 52b at opposite ends of the slider 21b each is formed with guide slot 119 which straddles the central rigidifying late 54b of the base 12b as the slider 21b is moved in either direction with respect to the access openings 18b, 19b.

For biasing the slider 21b to a central door closing position, a pair of slide actuators 120 are slidably mounted on the support rod 50b on opposite sides of the slider 21b. The actuators 120 in this case each have a generally L-shaped configuration defined by an upper portion 121 formed with a rod-receiving aperture 122 and a depending leg 124. The upper portion 121 of each actuator 120 has an inwardly directed tapered end 125 engageable with a respective tapered recess 126 on the end of the slider 21b which guides the actuator into predetermined mating relation with a slider to facilitate movement therebetween. For biasing the actuators 120 into engagement with opposite sides of the slider 21b when in a central door closing position, an extension spring 130 is connected between depending hooks 131 of each actuator 120 on the underside thereof. The spring 130 in this case is stretched along the underside of the slider 21b, with slots 119 in the depending flange 52b permitting free movement of the slider over to the spring 130.

For limiting movement of the actuators 120 while permitting free movement of the slider 21b, stops 134 in the form of upstanding laterally spaced ribs are located adjacent opposite sides of the rigidifying plate 54b. The depending legs 124 of the actuators 120 are adapted for engaging the stops 134 to limit movement, while the slots 119 in the depending flanges 52b of the slider 21b are of sufficient width to permit passage of the slider 21b over the stops 134 in either direction.

It will be seen that regardless of the direction in which the slider 21b is moved relative to the access openings 18b, 19b, the extension spring 130 is extended to provide force for returning the slider 21b to its central closing position upon release. For example, when the slider 21b is moved to the right, as depicted in FIG. 25, such as an incident to positioning of the cartridge into a optical disk reader, the slider 21b will force and move the actuator 120 on the right-hand side thereof, while movement of the opposite actuator 120 is restrained by stops 134, thereby further stretching the return spring 130 (as shown in FIG. 25) and providing the force for return of the slider 21b and door 20b to the central closed position. Likewise, movement of the slider and doors 21b and 20b in the opposite direction, will cause the slider 21b to move the adjacent actuator to the left, as viewed in FIG. 24, while the other actuator is restrained by stops 134, again stretching the return spring.

The door supporting mechanism for the cartridge 106 again lends itself to efficient preliminary and final assembly. A slider and support rod subassembly may be readily produced by positioning the slider 21b onto the support rod 50b, positioning the slide actuators 120 onto opposite ends of the support rod 50b, and then positioning the spring 130 over the hooks 131 of the slide actuators 120. The slide and support rod subassembly may then be assembled into the cartridge base 12b by snapping the ends of the support rod 50b into the side wall apertures 56b. The door 20b, of desired design, may thereafter be assembled on and snapped into engaging relation with the slider 21b.

From the foregoing, it can be seen that the data information cartridge of the present invention is adaptable for more effective and efficient usage by commercial establishments by preventing access and handling of contained disks by unauthorized personnel, while enabling easy access and removal of disks by authorized personnel. The cartridge lends itself to efficient manufacture and automated assembly, with relatively small design and tooling changes enabling selective production of cartridges with manually releasable access covers or cartridges which gives a user the perception of being a permanent container for the disk and which require a special tool or fixture for opening. The cartridge door mounting structure also facilitates reliable movement of the door between opening and closing positions while lending itself to both automated subassembly and final assembly into the cartridge.

What is claimed is:

1. A protective cartridge for a data information disk comprising a case which defines a compartment for enclosing and containing a disk, said case including a base and a cover mounted for pivotal movement relative to said base between a closed position for containing said disk and an open position for permitting insertion and removal of said disk, a sliding door mounted on a forward end of said case for movement from a closed position covering said disk to an open position for exposing said disk during a read operation, said door having at least one shutter overlapping an outer planar surface of said case and a slider for supporting said shutter for movement relative to said case, a slider support rod, said slider having at least one mounting aperture through which said support rod extends for supporting said slider for relative movement, at least one return spring biasing said door in a closing direction when moved to the open position, said base having side walls formed with apertures adjacent the forward end of said case, said rod, slider, and at least one return spring forming a door subassembly, said rod having a length greater than the spacing between said sidewalls, and at least one of said rod and said base sidewalls being sufficiently resilient to permit mounting of said door subassembly by snap action engagement of said rod into said base sidewall apertures.

2. The protective cartridge of claim 1 in which said case is formed with at least one outwardly opening channel, said rod extending along said channel, and said slider being mounted for movement in said channel.

3. The protective cartridge of claim 2 in which said channel of said case defines forwardly extending legs for guiding movement of said slider in said channel.

4. The protective cartridge of claim 3 in which said case is formed with at least one access aperture that is covered by said door when in a closed position, and said case is formed with a pair of said outwardly opening channels disposed on opposites of said access aperture within which said slider is moveable.

5. The protective cartridge of claim 1 including a pair of slide actuators mounted on said support rod on opposite sides of said slider for relative sliding movement with respect to said support rod, and said return spring being connected in tension between said slide actuators.

6. The protective cartridge of claim 5 in which one of said slide actuators is moveable with said slider and door as an incident to movement of said door to an open position while the other of said slide actuators is restrained from movement.

7. The protective cartridge of claim 5 in which said return spring draws said slide actuators into engagement with opposite sides of said slider when said door is in a closed position.

8. The protective cartridge of claim 5 in which said case is formed with at lease one access aperture, said slider and shutter being moveable relative to said rod to an open position on either side of said access aperture, and said slider simultaneously moves one of said slide actuators along said support rod to increase tensile forces on said spring when said door is moved to an open position adjacent one side of said access aperture, and said slider moves the other slide actuator in an opposite direction to increase the tensile force of said spring when said door is moved to an open position on an opposite side of said access aperture.

9. The protective cartridge of claim 8 including a first stop for limiting movement of said one actuator when the door is moved to an open position on one side of said access aperture and a second stop for limiting movement of said other actuator when said door is moved to an open position on the opposite side of said access aperture.

10. The protective cartridge of claim 9 in which said stops are formed on said case.

11. The protective cartridge of claim 5 in which said slide actuators each have a depending flange, and said spring is secured between said depending flanges in outwardly spaced relation to said rod.

12. The protective cartridge of claim 1 in which said base is formed with a plurality of hinge pins, and said cover is formed with recessed retainers for snap action pivotal mounting on said hinge pins.

13. The protective cartridge of claim 12 in which said hinge pins are disposed within said compartment.

14. The protective cartridge of claim 13 in which said base has at least one outwardly opening channel for guiding movement of said slider, said channel having an inner side adjacent said compartment, and said hinge pins are disposed within said compartment adjacent the inner side of said channel.

15. The protective cartridge of claim 1 in which said door includes a shutter mountable in overlaying relation to said case, and said shutter and slider define a snap action engageable mounting for said shutter.

16. The protective cartridge of claim 1 in which said base defines at least one channel for guiding movement of said slider, and said base sidewalls are disposed on opposite sides of said channel.

17. A method of assembling a data information disk cartridge having a disk containing case and a spring biased door and slider mounted on a support rod for movement on said case between open and closed positions comprising the steps of forming mounting apertures in sidewalls of said case adjacent a forward end thereof, assembling the slider onto the support rod having a length greater than the spacing between said sidewalls, assembling at least one biasing spring on said support rod to form a door subassembly comprising the slider, support rod and spring, and mounting said subassembly in operative position on said case in a single assembly step by resiliently deforming at least one of said rod and case sidewalls to insert opposing ends of said rod in said sidewall apertures with snap action engagement.

18. The method of claim 17 including assembling slide actuators onto said support rod on opposite sides of said slider, and assembling said spring by securing said spring between said slide actuators in outwardly disposed relation to the support rod.

19. The method of claim 18 including securing said spring in a tension between said slide actuators for biasing said slide actuators into engagement with opposite sides of said slider.

20. The method of claim 17 including assembling said door onto said slider following mounting of said subassembly on said case.

21. A method of assembling a data information disk cartridge having a disk containing case defined by a base and a pivotal cover and a spring biased door and slider mounted on a support rod for movement on said case between open and closed positions comprising the steps of forming mounting apertures in sidewalls of said base adjacent a forward end thereof, assembling said door onto the support rod having a length greater than the spacing between said sidewalls, assembling at least one biasing spring on said support rod to form a door subassembly comprising the slider, support rod and spring, and mounting said subassembly on said base in a single assembly step by resiliently deforming at least one of said rod and base sidewalls to insert opposing ends of said rod in said sidewall apertures with snap action engagement, and mounting a door shutter in overlaying relation to said case by snap action engagement of said door shutter on said slide.

22. The method of claim 21 including mounting said cover on said base with snap action engagement.

23. The method of claim 21 including pre-assembling slide actuators onto said support rod on opposite sides of said slider, and securing said spring in tension between said slide actuators in outwardly disposed relation to the support rod.

24. A protective cartridge for a data information disk comprising a case which defines a compartment for enclosing and containing a disk, said case having an access opening, a sliding door moveable from a closed position covering said access opening and disk to an open position for exposing said access opening and disk during a read operation, said door having at least one shutter overlapping an outer planar surface of said case and a slider for supporting said shutter for movement relative to said case, a slider support rod mounted in an end of said case, said slider having at least one mounting aperture through which said support rod extends for supporting said slider for relative movement, said slider and shutter being movable relative to said support rod to an open position on either side of said access aperture, a pair of slide actuators mounted on said support rod on opposite sides of said slider for relative sliding movement with respect to said support rod, a return spring connected between said slide actuators for biasing said door in a closing direction when moved to an open position, said slider simultaneously moving one of said actuators along said support rod to increase tensile forces on said spring when said door is moved to said open position adjacent one side of said access aperture, said slider simultaneously moving the other slide actuator in an opposite direction to increase the tensile force of said spring when said door is moved to an open position on an opposite side of said access aperture, a first stop formed on said case for limiting movement of said one actuator when the door is moved to an open position on one side of said access aperture, a second stop formed on said case for limiting movement of said other actuator when said door is moved to an open position on the opposite side of said access aperture, and said slider being formed with at least one opening through which said spring extends for enabling relative movement of said slider with respect to said spring.

25. The protective cartridge of claim 24 in which said slider is formed with an outwardly opening groove through which said spring extends for enabling relative movement of said slider with respect to said spring.

26. A protective cartridge for a data information disk comprising a case which defines a compartment for enclosing and containing a disk, said case having an access opening, a sliding door moveable from a closed position covering said access opening and disk to an open position for exposing said access opening and disk during a read operation, said door having at least one shutter overlapping an outer planar surface of said case and a slider for supporting said shutter for movement relative to said case, a slider support rod mounted in an end of said case, said slider having at least one mounting aperture through which said support rod extends for supporting said slider for axial movement along said support rod, said slider and shutter being movable relative to said support rod to an open position on either side of said access aperture, a pair of slide actuators mounted on said support rod, said slide actuators each being entirely disposed outwardly from a respective axial end of said slider for relative sliding movement with respect to said support rod, a return spring connected between said slide actuators for biasing said door in a closing direction when moved to an open position, said slider simultaneously moving one of said actuators along said support rod to increase tensile forces on said spring when said door is moved to said open position adjacent one side of said access aperture, said slider simultaneously moving the other slide actuator in an opposite direction to increase the tensile force of said spring when said door is moved to an open position on an opposite side of said access aperture, a first stop formed on said case for limiting movement of said one actuator when the door is moved to an open position on one side of said access aperture, a second stop formed on said case for limiting movement of said other actuator when said door is moved to an open position on the opposite side of said access aperture, and said slider being formed with at least one opening through which said spring extends for enabling relative movement of said slider with respect to said spring.

27. A protective cartridge for a data information disk comprising a case which defines a compartment for enclosing and containing a disk, said case including a base and a cover mounted for pivotal movement relative to said base between a closed position for containing said disk and an open position for permitting insertion and removal of said disk, a sliding door moveable from a closed position covering said disk to an open position for exposing said disk during a read operation, said door having at least one shutter overlapping an outer planar surface of said case and a slider for supporting said shutter for movement relative to said case, a slider support rod mounted in an end of said case, said slider having at least one mounting aperture through which said support rod extends for supporting said slider for relative movement, at least one return spring biasing said door in a closing direction when moved to the open position, said case being formed with at least one outwardly opening channel that defines forwardly extending legs, said rod extending along said channel and said slider being mounted for movement in said channel, and said slider having side surfaces that are guided by said channel legs and transverse flanges that are movable on surfaces of said channel legs.

28. A protective cartridge for a data information disk said case comprising a case which defines a compartment for enclosing and containing a disk, said case having an access opening, a sliding door moveable from a closed position covering said access opening and disk to an open position for exposing said access opening and disk during a read operation, said door having at least one shutter overlapping an outer planar surface of said case and a slider for supporting said shutter for movement relative to said case, a slider support rod mounted in an end of said case, said slider having at least one mounting aperture through which said support rod extends for supporting said slider for axial movement along said support rod, said slider and shutter being movable relative to said support rod to an open position on either side of said access aperture, a pair of slide actuators mounted on said support rod, said slide actuators each being entirely disposed outwardly from a respective axial end of said slider for relative sliding movement with respect to said support rod, a return spring connected between said slide actuators for biasing said door in a closing direction when moved to an open position, said slider simultaneously moving one of said actuators along said support rod to increase tensile forces on said spring when said door is moved to said open position adjacent one side of said access aperture, said slider simultaneously moving the other slide actuator in an opposite direction to increase the tensile force of said spring when said door is moved to an open position on an opposite side of said access aperture, a first stop formed on said case for limiting movement of said one actuator when the door is moved to an open position on one side of said access aperture, and a second stop formed on said case for limiting movement of said other actuator when said door is moved to an open position on the opposite side of said access aperture.

\* \* \* \* \*